Dec. 15, 1925.                                              1,565,924
                    P. S. GRAVER
                        TANK
                 Filed May 26, 1924

Inventor:
Philip S. Graver

Patented Dec. 15, 1925.

1,565,924

UNITED STATES PATENT OFFICE.

PHILIP S. GRAVER, OF CHICAGO, ILLINOIS.

TANK.

Application filed May 26, 1924. Serial No. 715,924.

*To all whom it may concern:*

Be it known that I, PHILIP S. GRAVER, a citizen of the United States, residing at Chicago, in the county of Cook and the State of Illinois, have invented a certain new and useful Improvement in Tanks, of which the following is a full, clear, concise, and exact description.

My invention relates to tanks and particularly to those tanks employing pipes mounted to swing up and down in their interiors, although the invention is not to be thus limited. My invention resides in the provision of improved means for relating the band or cable for operating the swinging pipes or other devices within the tanks with the tanks through which such bands or cables pass.

In accordance with one characteristic of the invention, such a tank is substantially sealed by a stuffing box or packing where the band or cable passes through the tank. I also provide means for maintaining the band or cable straight and tangential to an external pulley where it passes through the tank to avoid warping of the band or cable and consequent chafing. A guiding pulley is desirably employed for this purpose, this pulley being located within the tank and above a floor portion which has a slot through which the band or cable passes to the guiding pulley and of such size as to prevent this pulley from dropping into the tank in the event of the dislodgment of this pulley.

Figure 1:
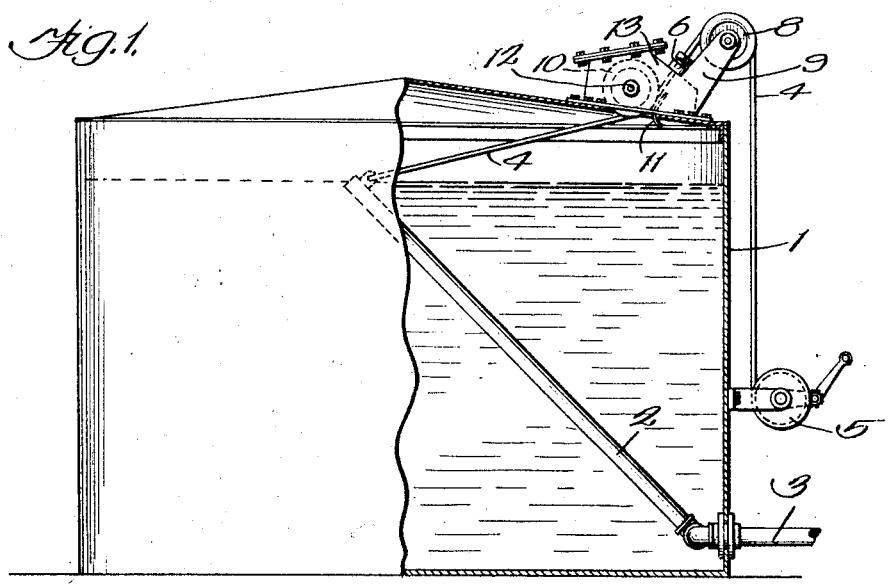
Figure 2:
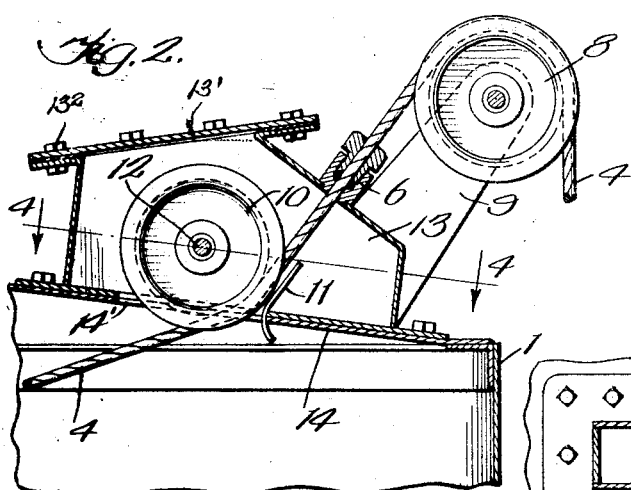
Figure 4:
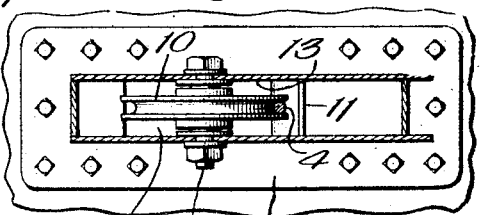
Figure 3:
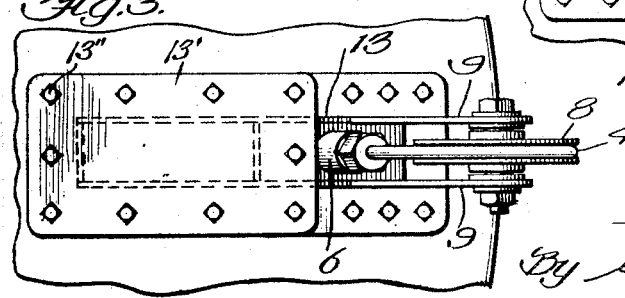

The invention will be more fully explained in connection with the accompanying drawing in which Fig. 1 is a general view showing a tank partly in section and the pulley mechanism in elevation; Fig. 2 is a larger side view of the pulley mechanism with parts shown in section; Fig. 3 is a plan view; and Fig. 4 is a sectional view on line 4—4 of Fig. 2.

The liquid holding tank 1 illustrated contains a pipe 2 mounted to swing in a vertical plane and establishing connection between the tank interior and a pipe 3 extending into the interior of the tank. The band 4, preferably a round cable, is employed to raise and lower the pipe 2 to adjust the level of the opening at the free end of this pipe with reference to the liquid level within the tank. The cable passes through a stuffing box or packing 6 which serves to seal the opening through which the cable passes whereby an excessive quantity of liquid is prevented from passing out of the tank and admission of liquid to the tank through this opening is prevented.

The cable 4 passes over a sheave or pulley 8 mounted with its axis horizontal upon brackets 9 carried upon the exterior of the tank. The bore of the stuffing box is on a tangent with the band or cable engaging face or groove of the sheave or pulley. A stretch of the band or cable upon both sides of and passing through the stuffing box is kept straight with the stuffing box bore and tangential with the sheave 8 by means of the guides 10 and 11, the guide 10 being preferably a pulley or sheave mounted with its axis horizontal upon a shaft 12 assembled with the sides of a separately formed housing 13 constituting an enlargement of the tank upon tank roof. The housing 13 has a roof section 13' secured thereto by bolts 13² and overlying the sheave 10 to afford access thereto and of a size to permit pulley 10 to be passed into and out of the housing. This housing carries the brackets 9 which support sheave 8 upon the exterior of the housing. The opening 14' in the roof of the tank and the floor portion 14 of the housing through which the band or cable passes is desirably elongated to permit an arcuate portion of pulley 10 to project into the interior proper of the tank. The opening 14' is sufficiently shorter than the diameter of pulley 10 to prevent this pulley from dropping through the opening if the pulley should become dismounted. The guide 11 is preferably in the nature of a shoe mounted adjacent one edge of the opening 14' and located close to and tangentially of the pulley 10 to maintain the band or cable in the pulley groove. This guide 11 is also carried by and within the housing. The stuffing box 6 is mounted upon the roof of the housing.

A windlass 15 is mounted upon the exterior of the tank and has the band or cable attached thereto for the purpose of adjusting the swinging pipe 2.

By the construction described, the band or cable may be worked back and forth without wearing the band or tank where the band passes through the tank while at the same time obstructing the passage of fluid in either direction through the tank at this point. In the event of breakage of the guiding pulley 10 it is prevented from dropping through the floor portion 14 into the interior proper of the tank because of the restricted size of the opening 14' in this floor portion.

Changes may be made without departing from my invention.

Having thus described my invention, I claim:—

The combination with a tank having a roof; of a housing added to the tank and supported upon its roof, there being an opening in the roof of the tank beneath the roof of the housing; a pipe mounted to swing up and down within the tank; a cable connected with said pipe to swing it and passing through said opening in the tank roof; a stuffing box carried upon the roof of the housing, said cable passing through said stuffing box to the exterior of the housing; a sheave receiving said cable after passing from the stuffing box; and another sheave mounted upon and within the housing over the aforesaid opening in the tank roof and receiving the cable in passing to the stuffing box, said opening being of such a size that the latter sheave will not pass therethrough when dismounted, the housing having a displaceable section affording access to its interior and of a size, when displaced, to permit the second sheave to be admitted to the housing.

In witness whereof, I hereunto subscribe my name.

PHILIP S. GRAVER.